May 24, 1949.    C. S. ROYS    2,471,286
ALTERNATING CURRENT GENERATOR
Filed March 29, 1946    2 Sheets-Sheet 1

Inventor
Carl S. Roys.

May 24, 1949.  C. S. ROYS  2,471,286
ALTERNATING CURRENT GENERATOR
Filed March 29, 1946　　　　　　　　　　　　　2 Sheets-Sheet 2

Inventor
Carl S. Roys

Patented May 24, 1949

2,471,286

UNITED STATES PATENT OFFICE 2,471,286

ALTERNATING CURRENT GENERATOR

Carl S. Roys, West Chicago, Ill., assignor, by mesne assignments, to Nader Engineering Company, a corporation of Illinois Application March 29, 1946, Serial No. 658,060

2 Claims. (Cl. 322—96)

This invention relates to dynamoelectric machines, and particularly to an improved alternating current dynamoelectric machine of the commutator type and method of operation of such machine.

Alternating current motors and generators which have been heretofore known have been seriously limited in the scope of their application by certain inherent characteristics. The limitations are particularly apparent in the case of alternating current generators of both the polyphase and single phase type. There are many applications where there is a recognized need for alternating current power but the available prime movers are of the internal combustion type engines in which the speed of the engine must necessarily vary over a wide range to accomplish the primary purpose of the engine. A particular illustration of such situation is the modern airplane, which is powered by one or more internal combustion engines having a wide range of speeds during normal operation of the plane.

It has long been recognized that a source of A. C. power on aircraft would be particularly desirable for operation of a variety of circuits, particularly the navigational control instruments and the radio instruments. Due to the fact that all known commercial dynamoelectric alternators vary in frequency directly with the speed of their rotors, it has not been possible to apply an A. C. generator to aircraft applications without adding an excessive weight of additional equipment to the plane and, of course, greatly increasing the cost of providing a source of power on the aircraft as compared with a D. C. generator.

Two expedients have heretofore been commonly utilized to supply alternating current power in applications where the available prime mover constitutes a variable speed device. In one common arrangement, a D. C. generator is driven by the variable speed prime mover and the output of this generator, in turn, drives a D. C. motor. The D. C. motor, in turn, drives the A. C. alternator. Obviously a complicated and expensive control arrangement must be provided to carefully control the output voltage of the D. C. generator in such manner as to maintain the D. C. motor at a substantially constant speed to insure the constancy of frequency of the A. C. output. The efficiency of such arrangement is obviously low, inasmuch as the overall efficiency of the unit is the product of the individual efficiencies.

The other expedient relied upon is the provision of a mechanical variable speed drive connection between the variable speed prime mover and the alternating current generator. Such devices were necessarily extremely complicated, due to the wide speed range over which they had to operate and hence constituted a substantial weight addition for aircraft installations and were expensive, not only in first cost, but in maintenance.

Even when constant speed prime movers are available to drive alternating current generators of known design at constant speed, the problem of exact synchronization of such generators arises whenever it is desired to operate two or more conventional alternating current generators in parallel.

Likewise a primary deficiency of alternating current motors of conventional design is the fact that their speed varies substantially with the frequency of the applied voltage. At the same time, the speed of such conventional motors cannot be controlled by simple adjustments in the field circuit similar to direct current motor control.

Accordingly it is an object of this invention to provide an improved alternating current, dynamoelectric machine having novel and desirable voltage, speed and frequency characteristics.

Another object of this invention is to provide an improved method of operation of a commutator type dynamoelectric machine to cause such machine to function as an alternating current generator having improved characteristics.

A further object of this invention is to provide an improved dynamoelectric alternating current machine which, when operated as a generator, will yield an output frequency substantially independent of speed or, when operated as a motor, will function at a speed substantially independent of variations in the frequency of the power supply.

Another object of this invention is to provide an improved alternating current generator adapted to be driven by a variable speed prime mover and characterized by the fact that the output frequency of the generator is substantially independent of both the speed of the prime mover and the character of the load supplied by the generator.

A particular object of this invention is to provide an improved alternating current, commutator type dynamoelectric machine characterized by the connection of a field winding in shunt to the power terminals of the machine and a condenser connected in series with the field winding.

A further object of this invention is to provide an improved alternating current generator in which a high frequency output may be obtained without requiring a correspondingly high speed of rotation of the rotor of the generator or a large number of field poles.

A particular object of this invention is to provide an improved alternating current generator which will operate either self or separately excited and whose output frequency can be readily varied over wide limits by simple adjustments in the field circuit of the generator and is independent of the speed of the rotor of the generator.

A further object of this invention is to provide an improved alternating current dynamoelectric machine of the commutator type which, when operated as a motor, permits ready variation of the power factor of the motor by simple adjustments in the field circuit of the machine.

A further object of this invention is to provide an improved alternating current generator yielding an output voltage whose frequency is independent of rotor speed yet variable by simple adjustment in the field circuit of the generator and having an unusually accurate sinusoidal wave form which is unaffected by load variations or flux distribution around the air gap.

Another object of this invention is to provide an improved alternating current dynamoelectric machine of the commutator type which will operate with a shunt field in a manner similar to the operation of a direct current, dynamoelectric machine and may be provided with series fields to yield compound or differential characteristics similar to those obtainable in a direct current dynamoelectric machine.

Another object of this invention is to provide an improved alternating current generator particularly adaptable to parallel operation in that a plurality of such generators driven at different speeds may be connected in parallel to yield a common frequency output without the necessity of synchronizing such generators.

The specific nature of this invention as well as other objects and advantages thereof will clearly appear from the following detailed description of the appended drawings, which, by way of preferred example, illustrate several embodiments of the invention.

Fundamentally this invention comprises the utilization of an alternating current, commutator type dynamoelectric machine having an armature rotating relative to a field structure and providing a primary exciting winding on such field structure which is connected in shunt to the armature terminals of the dynamoelectric machine or energized by a separate source of alternating current power. The novel and improved performance achieved by this invention is accomplished by the introduction of capacitive reactance in series relation with the aforedescribed primary exciting winding field and proportioning such capacitive reactance to other circuit constants of the dynamoelectric machine to achieve certain desired results as will be brought out in detail later.

A further feature of this invention is the provision of a compensating winding on a dynamoelectric machine of the type described and arranging the compensating winding in such manner as to achieve a fixed relationship between circuit constants of the dynamoelectric machine to further improve the frequency, voltage and speed characteristics as well as the commutation of such machine, whether acting as a generator or as a motor.

Figure 1:
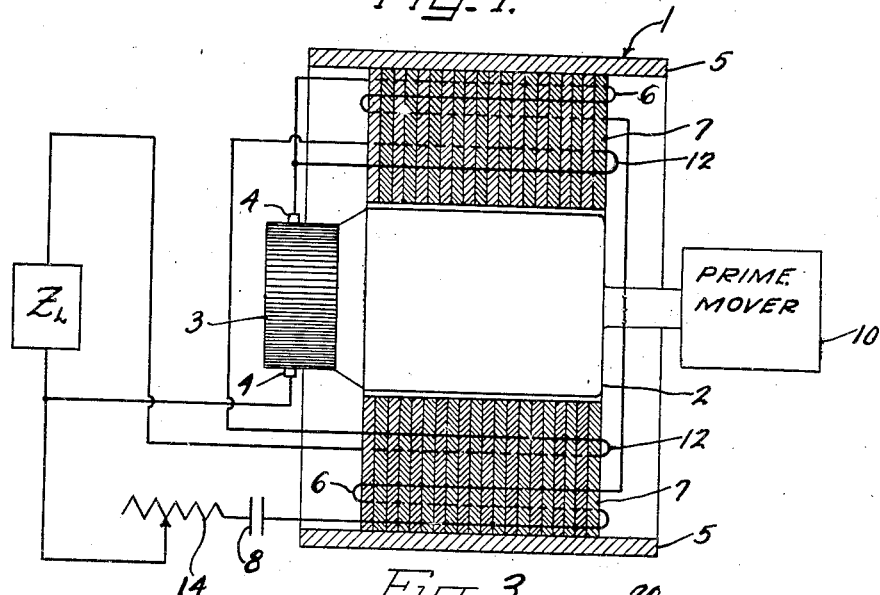
Figure 1 is a diagrammatic view of a dynamoelectric machine embodying this invention connected to operate as a self-excited alternating current generator.

In Figure 1 there is shown a circuit diagram of a single phase, commutator type alternating current generator 1 embodying this invention. It should be understood that the single phase dynamoelectric machines shown in this application are merely illustrative as the principles of this invention may be readily applied to polyphase machines. The generator 1 comprises a conventional armature 2 having the usual winding thereon rotating relative to a field structure 7 supported on a frame 5. End coil connections of the armature winding are brought out to the commutator 3 with which the brushes 4 cooperate. The brushes 4 are connected to supply power to any suitable load circuit, indicated diagrammatically by the load impedance $Z_L$.

A shunt field winding 6 is provided on generator 1 and may be mounted on the field structure 7 of the generator 1 in any one of several well known arrangements, and may be either a pole type or distributed winding. Field structure 7, however, should preferably be laminated to reduce core losses inherent in the alternating current excitation of shunt field winding 6. The shunt field 6 is, in accordance with this invention, connected directly across the load terminals of the generator through a series connected capacitive reactance 8. The armature 2 of the generator is suitably connected to be driven by a variable speed prime mover 10 which may, for purposes of example only, comprise an internal combustion engine such as one of the engines utilized on aircraft. Accordingly the speed of prime mover 10 varies over a wide range and is subject to speed varying conditions independent of the voltage, current or frequency desired in the load circuit $Z_L$.

To further improve the output characteristics of generator 1 a compensating winding 12 may be provided which, in the specific modification illustrated in Figure 1, is shown as connected in series with the armature 2. It should be understood, however, that the compensating winding 12 may be energized in any other one of several well known circuit arrangements or may, in fact, comprise a short-circuited winding. The specific electrical characteristics of compensating winding 12 will be developed in detail later.

When the generator 1 is driven by prime mover 10, an alternating current output voltage is generated and applied to the load $Z_L$. With the described construction, the frequency of such generated voltage will be found to be determined by the circuit constants of the generator, as will be developed mathematically later, and such frequency is substantially independent of the speed of the prime mover 10 or the nature of the impedance of the load $Z_L$. In other words, the generator 1 functions as a self-excited shunt A. C. generator delivering a single phase alternating current voltage of substantially constant frequency, irrespective of the speed at which the armature 2 is driven by prime mover 10. The output voltage of such generator may be readily controlled in a manner similar to the control of a self-excited D. C. generator by varying the excitation of the shunt field 6 through the medium of a series connected, variable resistor 14.

The foregoing unusual performance characteristics of the self-excited alternating current generator embodying this invention have been verified by experiment but may be proved by mathematical analysis.

Figure 2:
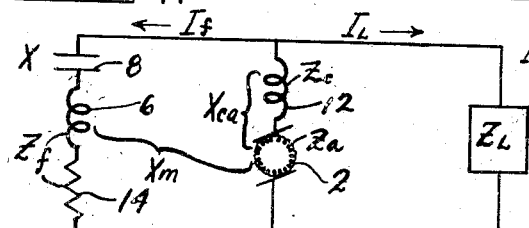
Figure 2 is an equivalent mathematical circuit diagram of the generator of Figure 1.

In Figure 2 there is shown a schematic circuit diagram of an alternating current commutator type generator embodying this invention with impedance symbols applied to the various elements of the generator and its associated circuit elements. Thus in Figure 2 the impedance of the armature 2 is represented by $Z_a$ which, of course, will be understood to have both resistance and reactive components $R_a$ and $X_a$, respectively. The impedance of compensating field 12 is represented by $Z_c$; the impedance of shunt field 6 by $Z_f$ (which also includes the variable resistance 14); the impedance of the condenser 8 is represented by $X$; the load impedance is of course $Z_L$, having resistance component $R_L$ and reactance component $X_L$; $X_m$ is the mutual reactance between the armature winding and the shunt field winding 6; $X_{ac}$ is the mutual reactance between the armature winding and the compensating field winding 12; and $v$ is defined by $2\pi f v$ being the angular velocity of the armature 2 in radians per second where $f$ is the frequency of the generated voltage.

Now let
$$Z_1 = Z_f - jX = R_f + j(X_f - X)$$
$$Z_2 = Z_a + Z_c - 2jX_{ac} = R_a + R_c + j(X_a + X_c - 2X_{ac})$$

then if $I_f$ is the current flowing in the field circuit mesh and $I_L$ the current flowing in the load circuit mesh, the voltages around each mesh may be equated as follows:

(1) $\begin{cases} (Z_1+Z_2)I_f + Z_2 I_L - vX_m I_f = 0 \\ Z_1 I_f - Z_L I_L = 0 \end{cases}$ Solving Equations 1 for $I_f$ by determinants, (2) $I_f = \dfrac{0}{\begin{vmatrix} Z_1+Z_2-vX_m & Z_2 \\ Z_1 & -Z_L \end{vmatrix}}$ Since there is no external source of voltage in the circuit of Figure 2, such circuit will be self-exciting only for values of $I_f$ different than zero.

Hence, in Equation 2 above, the only condition for a solution for $I_f$ other than zero is for the determinant in the denominator to be zero.

Hence, for no load conditions, when $I_L = 0$,
$$Z_1 + Z_2 - vX_m = 0$$
or (3) $R_f + j(X_f - X) + R_a + R_c + j(X_a + X_c - 2X_{ac}) - vX_m = 0$ Equating reals and imaginaries of Equation 3

(4) $R_f + R_a + R_c - vX_m = 0$ and (5) $X_f - X + (X_a + X_c - 2X_{ac}) = 0$

Hence when the generator 1 operates self-excited, the frequency of the generated voltage will be such as to satisfy Equation 5. The voltage generated will build up to satisfy Equation 4.

Now in accordance with this invention, the compensating field winding 12 is designed to substantially neutralize the effects of armature reaction. Hence (6) $X_a + X_c - 2X_{ac} = 0$ and Equation 5 becomes for no load conditions
$$X_f = X$$
or
$$2\pi f L_f - \dfrac{1}{2\pi f C} = 0$$
and
$$f = \dfrac{1}{2\pi\sqrt{LC}}$$

Hence the frequency of the generated voltage at no load is substantially the resonant frequency of the field circuit mesh.

In order to satisfy Equation 4 the generated voltage will build up such that
$$(vX_m)I_f = (R_f + R_a + R_c)I_f$$

just as in the case of a D. C. self-excited, shunt generator.

Under load conditions, when $I_L$ is not zero, we derive from Equation 2 above
$$Z_L(Z_1 + Z_2 - vX_m) + Z_1 Z_2 = 0$$
or (7) $(R_L + jX_L)[R_1 + R_2 - vX_m + j(X_1 + X_2)] + (R_1 + jX_1)(R_2 + jX_2) = 0$ Equating reals and imaginaries of Equation 7 to zero, (8) $R_L(R_1 + R_2 - vX_m) + R_1 R_2 - X_L(X_1 + X_2) - X_1 X_2 = 0$ and (9) $X_L(R_1 + R_2 - vX_m) + R_L(X_1 + X_2) + R_1 X_2 + R_2 X_1 = 0$ Now if the compensating winding is properly designed to substantially neutralize armature reaction, then
$$X_2 = (X_a + X_c - 2X_{ac}) = 0 \text{ (approximately)}$$

So that Equations 8 and 9 become

(10) $R_L(R_1 + R_2 - vX_m) + R_1 R_2 - X_L X_1 = 0$

(11) $X_L(R_1 + R_2 - vX_m) + (R_L + R_2)X_1 = 0$

It should be noted that for a pure resistance load, hence where $X_L = 0$, Equation 11 becomes
$$X_1 = 0$$
or
$$X_f = X$$
and
$$f = \dfrac{1}{2\pi\sqrt{L_f C}}$$

Hence the generator functions at the same frequency as at no load.

Equation 10 may be rewritten as
$$R_1 + R_2 - vX_m = \dfrac{X_L X_1 - R_1 R_2}{R_L}$$

Substituting this into Equation 11,
$$\dfrac{X_L(X_L X_1 - R_1 R_2)}{R_L} + (R_L + R_2)X_1 = 0$$

Solving for $X_1$

(12) $X_1 = \dfrac{R_1 R_2 X_L}{R_L(R_2 + R_L) + X_L^2}$

Now if $R_L=0$, Equation 12 becomes

(13) $$X_1 = \frac{R_1 R_2}{X_L}$$

If the load is a pure inductance, $X_L = 2\pi f L_L$, hence from (13)

$$2\pi f L_L \left( 2\pi f L_f - \frac{1}{2\pi f C} \right) = R_1 R_2$$

or $$(2\pi f)^2 = \frac{1}{L_f C} + \frac{R_1 R_2}{L_L L_f}$$

(14) $$(2\pi f)^2 = \frac{1}{L_f C} + \left(1 + \frac{C}{\frac{L_L}{R_1 R_2}}\right)$$

Now in all practical generator designs, $$\frac{L_L}{R_1 R_2}$$

is very much greater than C which is on the order of a few microfarads. Hence Equation 14 reduces to substantially $$f = \frac{1}{2\pi \sqrt{L_f C}}$$

Thus the generator will generate a frequency substantially identical to the no load frequency for a pure inductive load. By similar reasoning it can be developed that substantially the same frequency is generated for a pure capacitance load.

Returning now to a general impedance load $Z_L$ having both resistive components $R_L$ and reactive components $X_L$,

(15) $$Z_L^2 = R_L^2 + X_L^2$$

Dividing both sides of Equation 12 by $R_1$ and substituting $Z_L^2$, Equation 12 becomes

(16) $$\frac{X_1}{R_1} = \frac{X_L}{R_L + \frac{Z_L^2}{R_2}}$$

Now let $w_0 = 2\pi f_0$ where $f_0$ is the frequency at no load, let $y$ = variation of $w$ from $w_0$ or $w = w_0(1+y)$.

Since $$X_1 = wL_f - \frac{1}{wC}$$

then $$X_1 = w_0(1+y) L_f - \frac{1}{w_0(1+y) C}$$

which for small values of $y$ becomes

(17) $$X_1 = 2w_0 L_f y$$

Substituting (17) in (16),

(18) $$\frac{X_1}{R_1} = \frac{2w_0 L_f y}{R_1} = \frac{X_L}{R_L + \frac{Z_L^2}{R_2}}$$

Solving (18) for $y$ and letting $$Q = \frac{w_0 L_f}{R_1}$$

$$y = \frac{X_L}{2Q \left( R_L + \frac{Z_L^2}{R_2} \right)}$$

(19) $$y = \frac{1}{2Q \left( \frac{R_L}{X_L} + \frac{Z_L^2}{R_2 X_L} \right)}$$

From Equation 19 it is obvious that $y$ will be very small providing the quantity $$\frac{2Q Z_L^2}{R_2 X_L}$$

is large—on the order of 100 or greater.

Now $$\frac{2Q Z_L^2}{R_2 X_L} = 2Q \left( \frac{Z_L}{R_2} \right) \left( \frac{Z_L}{X_L} \right)$$

Obviously $$\frac{Z_L}{X_L}$$

will always be greater than or equal to 1. For all practical generator designs, Q will be greater than 5 or 10 and $$\frac{Z_L}{R_2}$$

will be greater than 10, even in small machines. Hence $$\frac{2Q Z_L^2}{R_2 X_L}$$

will always be greater than 100, and accordingly $y$, the frequency variation from no load frequency, will be less than one per cent.

The foregoing mathematical analysis has of course neglected such minor indeterminate factors as commutator ripple and indicates that, except for such minor factors, the generated frequency is substantially independent of both the speed at which the rotor of the generator is driven and of the character of the load which the generator supplies. It further indicates that the frequency at which the generator operates, when the compensating field is properly designed to satisfy the conditions of the Equation 6, is substantially the resonant frequency of the series circuit of the shunt field inductance and the series connected capacitive reactance X.

Obviously the frequency of the generated voltage of a generator embodying this invention may be readily varied by simple adjustments in the field circuit of the generator, i. e., either by varying the capacitance of the condenser 8 or by varying the inductance of shunt field 6. Obviously a variety of well known arrangements for varying inductance or capacity in the shunt field circuit will be suggested to those skilled in the art.

The importance of the step of inserting a suitable capacitance in the field winding circuit of a self-excited commutator type generator in accordance with the method of this invention for operation of a dynamoelectric machine can be better appreciated when it is considered that without the condenser, the dynamoelectric machine will function as a direct current generator. Accordingly, an alternating current generator embodying this invention may be utilized as a variable frequency source and hence is of value for instrument calibration and similar applications. In connection with such precision applications, it should be noted that the wave form of the output voltage of a generator embodying this invention approaches to a remarkable degree a pure sinusoidal wave; furhermore, the wave form of the output voltage of this generator is not affected by the flux distribution in the air gap or by the load conditions of the generator. Furthermore, an alternating current generator in accordance with this invention permits the attainment of compounding characteristics similar to a D. C. generator. Suitable series fields (not shown) may be added to the generator 1 to provide compound or differential voltage characteristics.

Figure 3:
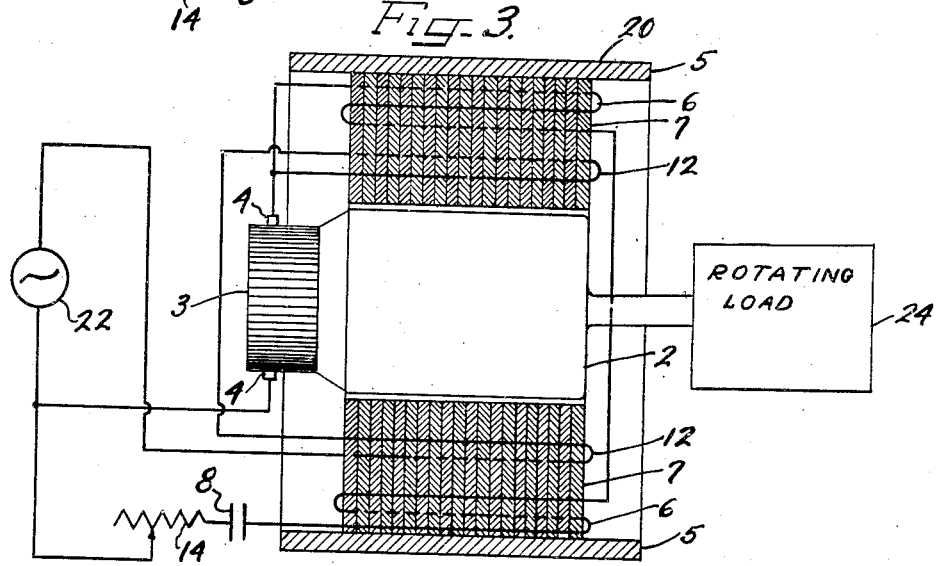
Figure 3 is a diagrammatic sectional view of a dynamoelectric machine embodying this invention and connected to operate as a motor.

It is of course a well known fact that any dynamoelectric machine may be reversibly utilized as a generator or a motor. Hence a dynamoelectric machine embodying this invention may be advantageously utilized as a motor and will provide performance characteristics heretofore unobtainable by motors of conventional design. In Figure 3 there is shown a dynamoelectric machine 20 embodying this invention which is identical in all respects to the generator 1 of Figure 1 with the exception that the dynamoelectric machine 20 is connected to receive power from an alternating current power source 22 and to drive a rotating load 24. Corresponding numerals of the motor 20 indicate similar parts on the generator 1 and it will be noted that a capacitive reactance 8 is again connected in series with the shunt field winding 6.

The motor 20 has the unusual characteristics of operating at substantially constant speed for any set of motor circuit constants, independent of the frequency of the alternating current power source 22. The self-excited, alternating current motor 20 has the further characteristic of being susceptible of speed control in the same manner as a D. C. motor. For example, a series winding (not shown) may be provided to yield compound or differential speed characteristics of the A. C. motor 20 with load. As in the case of a D. C. motor, speed control of the alternating current motor 20 may be brought about by variation of the armature voltage or of the field excitation. The latter form of control can of course be accomplished by varying an adjustable resistor 14 provided in the field circuit or by any other one of the well known arrangements for controlling the speed of a D. C. motor.

A further unusual performance feature of a motor embodying this invention is the fact that the power factor of the motor may be controlled by simple adjustments in the field circuit of the motor. Such power factor variations may be accomplished by varying the capacity of reactance 8 or the inductance in the shunt field winding 6 or in the shunt field winding circuit.

Figure 4:
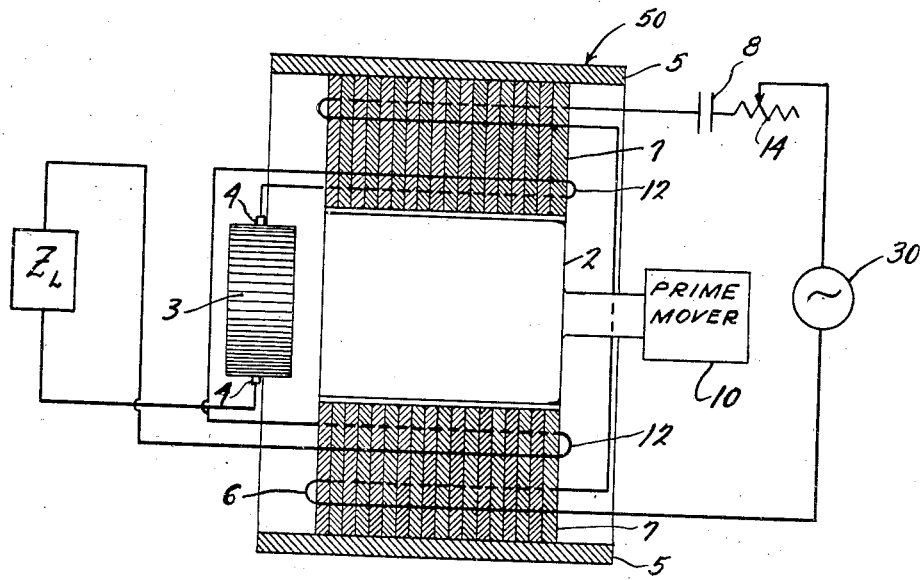
Figure 4 is a diagrammatic sectional view of a dynamoelectric machine embodying a modification of this invention, showing the machine operating as a separately excited alternating current generator.

A modification of this invention is shown in Figure 4 of the drawings wherein a generator 50 of similar construction to the generator of Figure 1 is again arranged to be driven by a variable speed prime mover 10. While the generator 50 is provided with shunt winding 6 and compensating winding 12, in a similar manner to the generator of Figure 1, the shunt winding 6 in this modification is connected through a capacitive reactance 8 and a variable resistance 14 to be energized from an external source of alternating current power 30. With this arrangement the frequency of the output voltage generated by generator 2 and applied to the load $Z_L$ will be identical with the frequency of the external source of alternating current power 30.

The alternating current generator 50 thus resembles a separately excited D. C. generator. In this modification the capacitive reactance 8 inserted in the circuit of the field winding 6 does not control the frequency output of the generator; however, such capacitive reactance greatly decreases the reactive kv.-a. required to be supplied to energize the field winding 6 and accordingly permits the excitation of the generator 50 from a relatively low voltage source of alternating current power. Alternatively, the provision of the capacitive reactance 8 in series with the field winding 6 permits such field winding to be formed by relatively small wire and to include a large number of turns. To achieve the same degree of field excitation without the capacitive reactance 8, the field winding 6 would have to be formed of large conductors having relatively few turns in order to maintain the inductive reactance of the field winding circuit at a low value.

The modified generator arrangement of Figure 4 has the same characteristics as that of Figure 1 in that the output frequency of the generator is also independent of the nature or character of the load $Z_L$. The output voltage may be readily adjusted in a manner similar to control of D. C. generators by simple adjustments in the field circuit, such as varying the variable resistor 14.

The properties of the described generators are particularly noteworthy in high frequency applications, such for example as when the generator is utilized as a power source for induction heating apparatus. In both modifications of this invention heretofore described, a generator embodying this invention may be utilized to produce an output voltage having a frequency up to a thousand cycles without requiring a high speed for the rotor of the generator or a large number of poles, or special design of the field winding circuit to reduce the inductance thereof in order to utilize an exciter of reasonable voltage rating.

Figure 5:
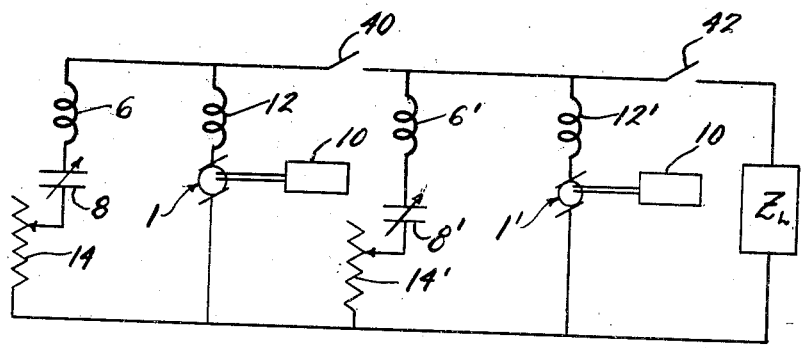
Figure 5 is a circuit diagram of a plurality of generators embodying this invention connected for parallel operation.

Another outstanding advantage of self-excited generators embodying this invention lies in the adaptability of such generators to parallel operation. In Figure 5 there is disclosed a circuit diagram illustrating in schematic form a typical circuit connection of two self-excited generators 1 and 1', respectively, for parallel operation to supply a load $Z_L$. While only two such generators are shown to be connected in parallel, it should be understood that similar operating characteristics will accrue for any number of such generators connected in parallel. Generators 1 and 1' are substantially identical in construction having self-excited shunt field windings 6 and 6' which are connected across the output terminals of the generators through series connected capacitive reactances 8 and 8' and adjustable resistors 14 and 14', respectively. Compensating windings 12 and 12' are provided to neutralize the armature reactance. The generators 1 and 1' are driven respectively by independent prime movers 10 and 10', the speed of each of which varies independently of the other.

A switch 40 is provided to connect the generator 1 in parallel with the generator 1' and a switch 42 is provided to connect the parallel operating generators to the common load $Z_L$.

It will be understood by those skilled in the art that if generators of conventional design were substituted for the generators 1 and 1' it would then be necessary to accurately synchronize the respective output voltages of the generators before effecting a parallel connection therebetween. With generators embodying this invention, each of the generators prior to their connection in parallel will generate a substantially constant frequency, independent of the speed of the respective prime movers, which is determined by the circuit constants of the individual generator circuit. Upon closing of the switch 40 connecting the generators 1 and 1' in parallel, the two generators will then operate at a common frequency and, if there was a difference between their two frequencies in their uncoupled condition, the common frequency will lie between the two individual frequencies of the generator. Such connection can be made by the simple expedient of closing the switch 40 and requires no synchronization of any kind. Closing of the switch 42 will then connect the parallel connected generators to supply the load $Z_L$.

The voltage applied to load $Z_L$ will be of substantially constant frequency and will not be affected by variations in speed of either of the independent prime movers 10 and 10', nor by the character of the load $Z_L$. Division of the load beneath the two parallel connected generators may be conveniently accomplished by adjusting the variable resistors 14 and 14' in their respective field circuits. Likewise the individual power factor of the generators 1 and 1' may be varied by adjusting the capacitive reactances 8 and 8' respectively. If the reactance adjustment in the field circuit of the generator 1 is made substantially equal and opposite to the reactance adjustment of the field circuit of the generator 1' then the output frequency applied to the load $Z_L$ will not change while the individual power factor of the generators 1 and 1' may be substantially varied. Load division between the two generators may also be accomplished, if desired, by controlling the speed of the respective prime movers 10 and 10' inasmuch as the output voltage of each of the generators is variable with the speed of such generators or by the provision of series fields utilized in the same manner as in D. C. generators.

From the foregoing description it will be apparent that a dynamolelectric machine embodying this invention provides unusual performance characteristics for an alternating current, commutator type dynamoelectric machine. Dynamoelectric machines embodying this invention provide novel and desirable relationships between the speed, frequency and load characteristics of the machine which have heretofore been impossible of attainment without resorting to auxiliary apparatus.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A self-excited, constant frequency, alternating current, commutator type generator comprising an armature winding, an exciting field winding wound on the field structures of said machine and disposed in cooperative relation to said armature winding, a capacitive reactance connected in series with said field winding, means connecting said capacitive reactance and said field winding to be energized in series by the generated voltage of said armature winding, said capacitive reactance being selected to substantially neutralize the inductive reactance of said field winding circuit at a predetermined frequency, and a compensating field winding on said generator constructed and disposed on common field structures with said exciting field winding and positioned in magnetic relation to said armature so as to substantially neutralize armature reaction flux, whereby the generated output of said generator will be substantially equal to said predetermined frequency and independent of the speed of the generator or character of the load supplied.

2. In a generating system, in combination, a plurality of varying speed prime movers, a plurality of self-excited, commutator type, alternating current generators respectively driven by said prime movers, each of said generators having an exciting field winding, a condenser connected in series with said field winding, means connecting said field winding and condenser to be energized in series circuit by the generated voltage of the respective generator, a compensating field winding constructed and disposed on said machine in cooperating magnetic relationship with said exciting field winding and armature so as to substantially neutralize armature reaction flux, and means connecting the outputs of said generators in parallel to supply a load, whereby the load current is of substantially constant frequency independent of differences in variations of speed of the respective prime movers and the character of the load.

CARL S. ROYS.

REFERENCES CITED

The following references are of record in the file of this patent:

UNITED STATES PATENTS

| Number | Name | Date |
|---|---|---|
| 390,930 | Westinghouse | Oct. 9, 1888 |
| 1,374,041 | Turbayne | Apr. 5, 1941 |

FOREIGN PATENTS

| Number | Country | Date |
|---|---|---|
| 408,198 | Great Britain | July 2, 1932 |
| 697,198 | France | Oct. 21, 1930 |